United States Patent Office 2,832,685
Patented Apr. 29, 1958

2,832,685

SOLUBILIZATION OF MILK PROTEINS

Everette C. Scott, Ashton, Ill., assignor, by mesne assignments, to Crest Foods Co., Inc., Ashton, Ill., a corporation of Illinois No Drawing. Application May 24, 1952
Serial No. 289,870

4 Claims. (Cl. 99—20)

The purpose of one aspect of this invention is to provide a new product comprising substantially the entire protein of milk in a form which is totally dispersible or soluble in aqueous solution. Another purpose of the invention is to provide a new method of peptizing of milk protein which is especially suitable for the entire protein of milk such as that known as casein-lactalbumin fusion or co-precipitation, the product of my co-pending patent application, Serial No. 763,441, filed July 24, 1947, and issuing December 23, 1952, as Patent Number 2,623,038, although also having some advantage in use for casein solubilization. In either event, the method produces a totally dispersible and highly concentrated protein material, which in dried form will imbibe water freely and will either go into complete solution of colloidal suspension.

Additional objects and advantages of the invention will be apparent from the following description.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

A water slurry of the entire protein is prepared by adding water to the casein-lactalbumin fusion (either before the latter is dried or after it is dried and finely ground) until the total solids content is about 12% to 14%. Lower concentrations can be used with greater ease but it is to our advantage to keep the total solids content as high as possible so as to minimize water removal in the drier. The product is then solubilized by the addition of alkalizing materials.

The solubilization of the protein is carried out under careful pH control. The pH of the denatured curd before the addition of any alkalizing material is 5.7 to 5.8. Selected alkaline materials, both strong and weak, are now added and the slurry of protein and water is heated to a temperature of about 180° F., and agitated. We find that we can work within a range of 150° F. and 212° F., but prefer a temperature range of 170° F. to 180° F. A temperature higher than 180° F. is wasteful. A temperature lower than 170° F. may require wasteful agitation and time.

We work with a combination of strong and weak alkalies to soften the curd, increase its hydration and restore the chemical charge. As an example, by adjusting the pH from the original 5.8 to 6.6 to 6.7 with potassium hydroxide and then by increasing the pH to approximately 8.0 to 8.5, 8.3 being preferred, by the addition of ammonium hydroxide, we effect maximum hydration and complete solubilization of the major protein fractions. When this product is then dried by spray drying equipment, the weak alkali or, in other words, the ammonium hydroxide all dissipates and the pH comes back to 6.6 or 6.7, at which point the pH has been controlled by the potassium hydroxide.

A great many alkaline materials may be used. Among the suitable strong alkalies are sodium hydroxide, potassium hydroxide, calcium hydroxide, magnesium hydroxide and sodium carbonate.

Among the weak alkalies are ammonium hydroxide, sodium bicarbonate and potassium bicarbonate. Ammonium hydroxide is preferred because it is completely volatile and is known to impart no taste.

The water holding properties of our final dried solubilized casein lactalbumin fusion is controlled primarily by the pH of the final dried product, which in turn is controlled by the pH to which the strong alkali was added. We have maximum hydration within the range of 6.6 and 7.3 pH. When our product is dried for such functional uses as demand maximum water holding properties, our pH is adjusted to the level of 6.6 to 7.3. We find little difference in water holding within this range, though there is a very slight gain up to 7.3. Hence the strong alkali is preferably added to a pH of 6.6 to 7.3, the choice depending on whether we are anxious for the product to have close to the natural pH of 6.6 to 6.7, or whether we wish to be more sure of obtaining maximum hydration.

When we want less water holding properties, we strive for a final pH of 5.8. This is practically identical with the pH of the original casein lactalbumin fusion before any manipulation. In making this product, we add sodium hydroxide or potassium hydroxide, or other strong alkali, to the slurry of casein lactalbumin fusion and water to a pH of approximately 6.7. We then add ammonium hydroxide or other weak alkali to bring the pH up to approximately 8.4. During this time, the product is heated to a temperature of 180° F. under agitation. We then add, just before drying, sufficient dilute hydrochloric acid or other edible acid to neutralize sufficient of the strong alkali to give a final product of 5.8 pH.

The method now preferred for producing the casein-lactalbumin fusion (which includes some beta lactoglobulin) is as follows:

The skim milk is delivered to a suitable receptacle such as a conventional cheese vat. At this point the normal titratable acidity is .16% to .18%. The titratable acidity is measured as lactic acid and is adjusted downwardly by the addition of a suitable alkalizing material to a point where the titratable acidity ranges between .08% and 0.1%. We usually elect to use sodium bicarbonate or soda ash or a combination of these two materials for this acidity reduction. However, other suitable substances, which are not nutritionally harmful and which are alkaline in reaction, may be used. The milk is then heated by direct heat transfer or by direct steam injection to a temperature of 190° F. to 194° F. The source of heat is then removed and the milk is brought to a quiescent state. Dilute hydrochloric acid is then added to bring about the complete precipitation of all the casein, lactalbumin and beta lactoglobulin fractions of the milk. Under the conditions of acidity and temperature above described, the casein, lactalbumin, and lactoglobulin all precipitate simultaneously and become a homogeneous mass of precipitated protein.

An optional method of heating and precipitation (after alkalizing) is to heat the milk continuously by means of a high temperature heater such as a plate heater or tubular heater and precipitate the proteins continuously by the injection of a metered amount of dilute hydrochloric acid into the hot milk as it passes over a riffle.

The whey, which results from the precipitation of the protein is withdrawn from the vat. The precipitated protein is then washed with hot water until all or practically all of the whey is removed. In this whey removal, essentially all of the lactose or milk sugar and the soluble salts and particularly the sodium salts are removed from the curd. The number of washings may vary, depending upon the concentration of protein desired in the final product. The washing is usually accompanied by the breaking up of the masses of curd by milling.

The curd or mass of protein is then pressed free of moisture, either by centrifugal force or by mechanical pressure in a suitable receptacle, such as a cheese press.

The curd as pressed or centrifuged, usually contains approximately 35% to 40% total solids. This curd can now be finely comminuted and transferred to the steam kettle with double action agitator for solubilizing, as above described. An alternate procedure is to dry the curd on screens after which it is finely ground through a hammermill and the powdered dried casein lactalbumin fusion may be transferred to the double action steam kettle for solubilizing as above described.

In the solubilization of casein, according to the preferred treatment, enough of the strong alkali is added to the insoluble casein to bring the pH to the desired level. This may be any place between 5.7 and 7.0. But we elect to carry the pH, under normal conditions, at approximately 6.6 to 6.7, which is normal for milk protein in its natural state. We then add ammonium hydroxide or other weak alkali, preferably enough to effect maximum hydration and solubilization of the curd or the casein, namely to a pH of 8.0 to 8.5, 8.2 being the point for which we commonly aim. This mixture is then heated and agitated as described in connection with solubilizing the fusion. In this soluble form, the casein is then dried, preferably by spray drying equipment, during which operation the ammonium hydroxide is volatilized.

Any casein, as precipitated by conventional methods, may be used. Such casein, solubilized as here described, are caseinates which may be used for various food and other commercial applications. Such caseinates as calcium caseinate and sodium caseinate are common in industry. The choice of strong alkali predetermines which caseinate will result from the above process. The resulting caseinate has the pH as fixed by the addition of the strong alkali.

Our process is based on sound theories of protein chemistry. The iso-electric point of casein and of the casein lactalbumin fusion is 4.6 to 4.7 pH. The stability of a protein is largely due to its electric charge and hydration. At the iso-electric point the charge is neutralized and the protein is dehydrated. This brings about a complete denaturation of the proteins. This condition is brought about in our initial precipitation of the curd from the milk. By subsequent pH manipulation, we are able to again hydrate the protein and restore a part of the charge. After hydrating, which is essentially a solubilizing process, as long as we keep the pH above the iso-electric point, we still have some hydration or charge. A pH of 5.8 which is the normal initial pH of the casein lactalbumin fusion, appears to be a critical level and going below that point materially reduces hydration and charge. This is manifested by a chalking consistency in the water solution. Below a pH of 5.8, there is some evidence of instability of the protein sol.

In our final hydrated and solubilized fusion product, we have completely reversed the order of the proteins as compared with their form in milk. In fresh milk the casein is in colloidal solution while the lactalbumin and the beta lactoglobulin are in true solution. In our final form, and particularly in the pH range of 6.6 to 7.3, the casein is essentially or almost entirely in solution while the lactalbumin and the lactoglobulin are essentially in colloidal suspension.

At pH's below 6.6, the water holding properties are greatly reduced due, we believe, to partial denaturation, and while the resulting protein powder will form a permanent colloidal suspension in water, it does not swell and thicken the mass as in the case where the casein is substantially all in solution and is holding its maximum water content.

Solubilized casein lactalbumin fusion is a white, practically flavorless, highly nutritious protein concentrate. It is used in human nutrition for supplemental diets, as an example, for pre- and post-operative feeding or feeding patients during convalescence. It is also used extensively in the frozen dessert industry as a body builder in low fat frozen desserts. When used in frozen desserts, or used in the making of malted milks and milk shakes, its protein contributes to the foam structure of the fat whip, the product being nourishing, palatable and otherwise desirable. Other uses for the solubilized casein lactalbumin fusion are the bakery industry, candy industry, prepared meats, bottled milk, bottled skimmed milk, bottled half-and-half or other cream products in any special foodstuff requiring high grade protein fortification.

I claim:

1. The method of solubilizing casein-lactalbumin coprecipitate which comprises adding to a water slurry thereof a relatively non-volatile alkali in a quantity to raise its pH to the range of 6.6 to 7.3, adding a volatile alkali in a sufficient quantity to raise its pH to approximately 8.4 and heating to a temperature of 150° F. to 212° F. to increase the water-holding properties of the coprecipitate, and thereafter drying the coprecipitate, thereby dissipating the volatile alkali and restoring the coprecipitate to a pH of 6.6 to 7.3.

2. The method of solubilizing casein-lactalbumin coprecipitate which comprises adding to a water slurry thereof a relatively non-volatile alkali in a quantity to raise its pH to a range of 6.6 to 7.3, adding a volatile alkali in a sufficient quantity to raise its pH to approximately 8.4 and heating to a temperature of 170° F. to 180° F. to increase the water-holding properties of the coprecipitate, and thereafter drying the coprecipitate, thereby dissipating the volatile alkali and restoring the coprecipitate to a pH of 6.6 to 7.3.

3. The product prepared by the process of claim 1.

4. The method of solubilizing edible casein which comprises adding to a water slurry thereof having a pH as low as 5.8 a substantially non-volatile alkali to a pH of 6.6 to 6.7, adding a volatile alkali to a pH of approximately at least 8.4 and heating to a temperature of 150° F. to 212° F. to increase the water-holding properties of the casein and spray drying the resultant product, thereby dissipating the volatile alkali.

References Cited in the file of this patent

UNITED STATES PATENTS

| | | |
|---|---|---|
| 868,445 | Just | Oct. 15, 1907 |
| 1,037,685 | Tambach | Sept. 3, 1912 |
| 2,101,633 | Whitaker et al. | Dec. 7, 1937 |
| 2,665,989 | Howard et al. | Jan. 12, 1954 |

OTHER REFERENCES

"Milk," by P. G. Heineman, published 1919, by W. B. Saunders Co., Philadelphia, pages 82 to 89.